United States Patent [19]

Park

[11] Patent Number: 5,677,730

[45] Date of Patent: Oct. 14, 1997

[54] SPOT ELIMINATION CIRCUIT FOR A CATHODE RAY TUBE

[75] Inventor: Tae-jin Park, Anyang, Rep. of Korea

[73] Assignee: Samsung Electronics Co., Ltd., Suwon, Rep. of Korea

[21] Appl. No.: 536,188

[22] Filed: Sep. 29, 1995

[30] Foreign Application Priority Data

Sep. 30, 1994 [KR] Rep. of Korea ............... 94-25943

[51] Int. Cl.⁶ ................................................. H04N 3/20
[52] U.S. Cl. ........................ 348/173; 348/377; 315/381
[58] Field of Search ............................. 348/173, 174, 348/725, 727, 728, 730, 739, 637, 325, 377, 834; 315/380, 381, 441

[56] References Cited

U.S. PATENT DOCUMENTS

| | | | |
|---|---|---|---|
| 3,535,445 | 10/1970 | Griffey | 315/381 |
| 4,340,910 | 7/1982 | Valdes | 348/173 |
| 5,036,257 | 7/1991 | Norman et al. | 348/173 |
| 5,084,657 | 1/1992 | Ueda | 348/381 |
| 5,184,225 | 2/1993 | Heidebroek et al. | 348/173 |

*Primary Examiner*—Victor R. Kostak
*Attorney, Agent, or Firm*—Banner & Witcoff, Ltd.

[57] ABSTRACT

An improved spot elimination circuit for preventing a spot from occurring on the screen of a cathode ray tube such as a monitor or television receiver at the instant that the deflection circuit is shut off. An input voltage is charged and discharged to supply a high voltage in negative polarity to a first grid of the cathode ray tube. The spot elimination circuit includes a flyback transformer having a separate turns portion additionally provided for generating a high voltage and utilizes the high voltage as an input to thereby supply a cut-off voltage to the first grid. Accordingly, the phosphor screen of the cathode ray tube is protected from excessive cathode luminance at a focused spot which can cause degradation of the screen.

3 Claims, 3 Drawing Sheets

SPOT ELIMINATION CIRCUIT FOR A CATHODE RAY TUBE

CROSS-REFERENCE TO RELATED APPLICATIONS

This application makes reference to, incorporates herein and claims all benefits accruing under 35 U.S.C. §119 from an application slier filed in the Korean Industrial Property Office on Sep. 30, 1994, entitled SPOT ELIMINATION CIRCUIT which was duly assigned Ser. No. 94-25943 by that Office.

BACKGROUND OF THE INVENTION

The present invention relates to an improved spot elimination circuit, and more particularly, to a spot elimination circuit for eliminating the spot phenomenon which occurs at the instant of turning off operation of deflection circuits in a monitor or a television capable of Display Power Management Signaling (DPMS) function.

Apparatus such as a television receiver or a monitor are generally well known in the art to include a cathode ray tube (CRT) having a deflection yoke for displaying an image. Normally, when power is turned off both horizontal and vertical deflection circuits in the apparatus are immediately shut down thus ceasing their respective deflection operations while high voltage charged within the CRT gradually drops.

As the heater provided inside the neck of the CRT for thermionic emission dissipates heat rather slowly, thermionic emission is gradually attenuated following heat dissipation. High voltage charged at a device in the CRT is slowly discharged concurrently with heat dissipation thereby attracting a thermionic emission in the direction of the screen of the CRT. Since the horizontal and vertical deflection circuits are shut down, that emission from the heater is pulled straight to the front of the CRT resulting in a bright spot on the screen, the reoccurrence of which over time may burn the phosphor screen surface of the inside of the CRT.

A block diagram and a detailed circuit diagram of an exemplary conventional design for a spot elimination circuit are illustrated in FIG. 1 and FIG. 2, respectively. A power supply 10 for applying a power source of alternating electrical current across a primary winding, or first coil, of a power supply transformer T is connected to a primary rectifier 20. A power source applied at power input terminal $V_{in}$ is rectified and smoothed by primary rectifier 20 comprising a rectifier diode D0 and a smoothing capacitor C0 and then applied to a first terminal of the primary winding of power supply transformer T in a switching circuit 30. A collector of a switching transistor Q1 is connected to the opposite, or second terminal, of the primary winding of power supply transformer T. An emitter of transistor Q1 is connected to a reference potential, such as a local circuit ground. Once power supply transformer T is initiated to be driven by switching transistor Q1 during ON/OFF mode of operation, then certain potential levels at the primary side are correspondingly induced across at the terminals of the secondary winding. The induced potential levels are smoothed by secondary rectifier 40 consisting of rectifier diode D1 and smoothing capacitor C1. The rectified potential level at the output of secondary rectifier 40 is at a voltage level of approximately 150 Volts.

Spot elimination circuit 50 has a charging capacitor C2 connected to the output of secondary rectifier 40, wherein the cathode of diode D2 is connected to capacitor C2, and the anode of diode D3 is connected to a first grid G1 of the CRT via resistor R1. A diode D2 is connected between the cathode of diode D3 and a reference potential. The output voltage of secondary rectifier 40, at a voltage level of approximately 150 Volts, charges capacitor C2 during normal power supplying status. Once capacitor C2 is completely charged, it then causes diode D3 to be in an OFF mode, i.e. a non-conductive state. As a result, the CRT is not influenced by spot elimination circuit 50.

In the conventional configuration constructed as described above and as illustrated in FIG. 2, an output at a voltage level of approximately −28 Volts induced at a secondary winding across a primary winding of a flyback transformer (FBT), which has a plurality of secondary windings for generating a high voltage, is applied to the CRT. Brilliance control of the CRT is regulated by the output voltage of −28 Volts applied at the first grid G1, which voltage level is variable by manual adjustment of variable resistor VR1 and being subject to a smoothing circuit consisting of capacitor C4 and diode D4.

When power source $V_{in}$ is turned off, capacitor C2 in spot elimination circuit 50 suddenly discharges its voltage in the reverse direction so that at that instant diode D3 is turned on, thereby discharging voltage at a voltage level of approximately −150 Volts in capacitor C2 as a cut-off voltage. Capacitor C2 was applying voltage to the first grid G1 of the CRT via resistor R1 but when diode D3 is turned on, the voltage reverses causing the electron beam emission to be cut-off thus barring the emission from landing on a focused spot on the phosphor screen to protect that spot from burning.

The conventional spot elimination circuit constructed as described above and as illustrated in FIGS. 1 and 2 does not discharge voltage potential charged at its capacitor C2 during the ON state of power source $V_{in}$, especially when the deflection circuits associated therewith are disabled suddenly, for example by malfunction of the deflection circuit or DPMS mode is initiated to be carried out in the CRT. Thus, a cut-off voltage would not be applied to first grid G1 of the CRT allowing thermionic emission from the heater to reach a focused spot on the phosphor screen which can result in burning the area of the spot.

SUMMARY OF THE INVENTION

It is therefore an object of the present invention to provide an improved spot elimination circuit.

It is another object to provide a spot elimination circuit for preventing a phosphor screen from burning by employing an output of an additional separate turn on the secondary winding side of deflection flyback transformer as an input voltage in the spot elimination circuit, whereby a timely supply of cut-off voltage in a CRT is enabled at the instant that a high voltage generator ceases its operation independent of the power supply.

A spot elimination circuit constructed according to the principles of the present invention is contemplated with a circuit for preventing the spot by applying a high voltage of negative polarity to the first grid of the CRT using discharging current flowing in reverse from a capacitor when the power supply is shut down. Additional separate turns are provided at a third winding of a flyback transformer for generating a high voltage to be supplied to the circuit as an input voltage.

A more complete appreciation of the present invention, and many of the attendant advantages thereof, will become readily apparent and are best understood by reference to the following detailed description when considered in conjunction with the accompanying drawings.

In the following detailed description, many specific details are set forth to provide a more thorough understanding of the present invention. It will be apparent, however, to those skilled in the art, that the present invention may be practiced without these specific details. In other instances, well known circuit components have not been described so as not to obscure the present invention.

DETAILED DESCRIPTION OF PREFERRED EMBODIMENT

Figure 1:
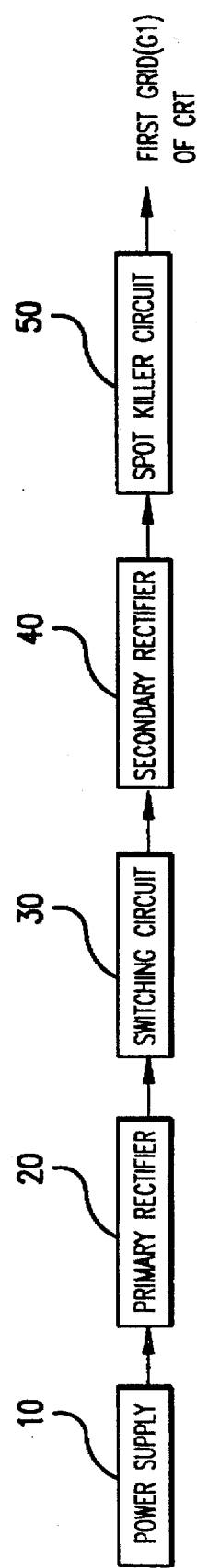
FIG. 1 is a block diagram illustrating a sequence of power supply in a conventional design incorporating a spot elimination circuit.
Figure 3:
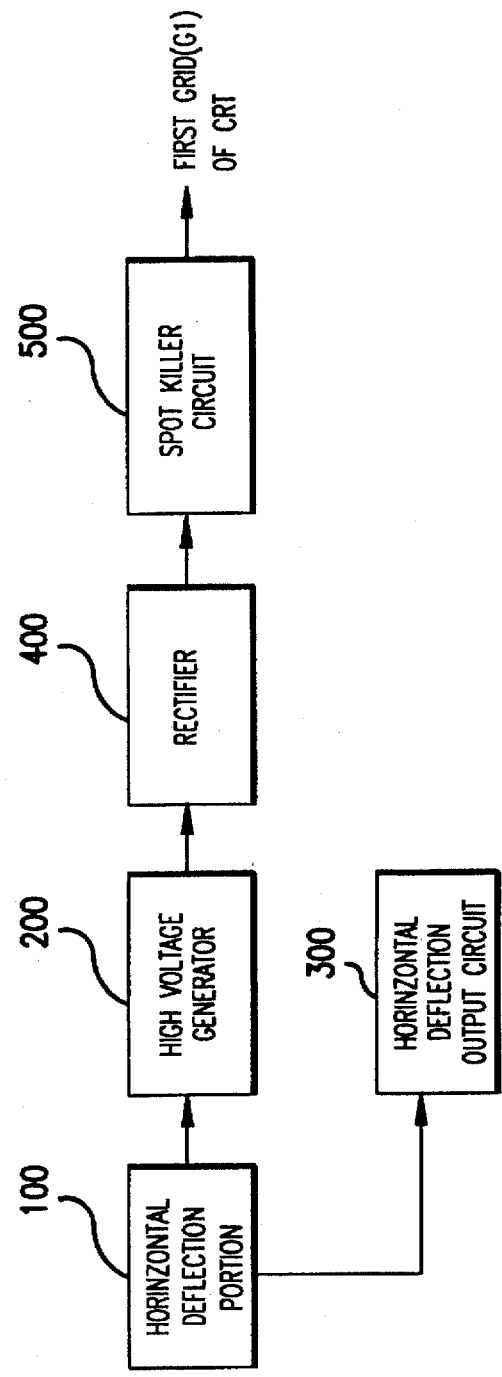
FIG. 3 is a block diagram illustrating a sequence of power supply in accordance with a preferred embodiment of the present invention incorporating an improved spot elimination circuit.
Figure 2:
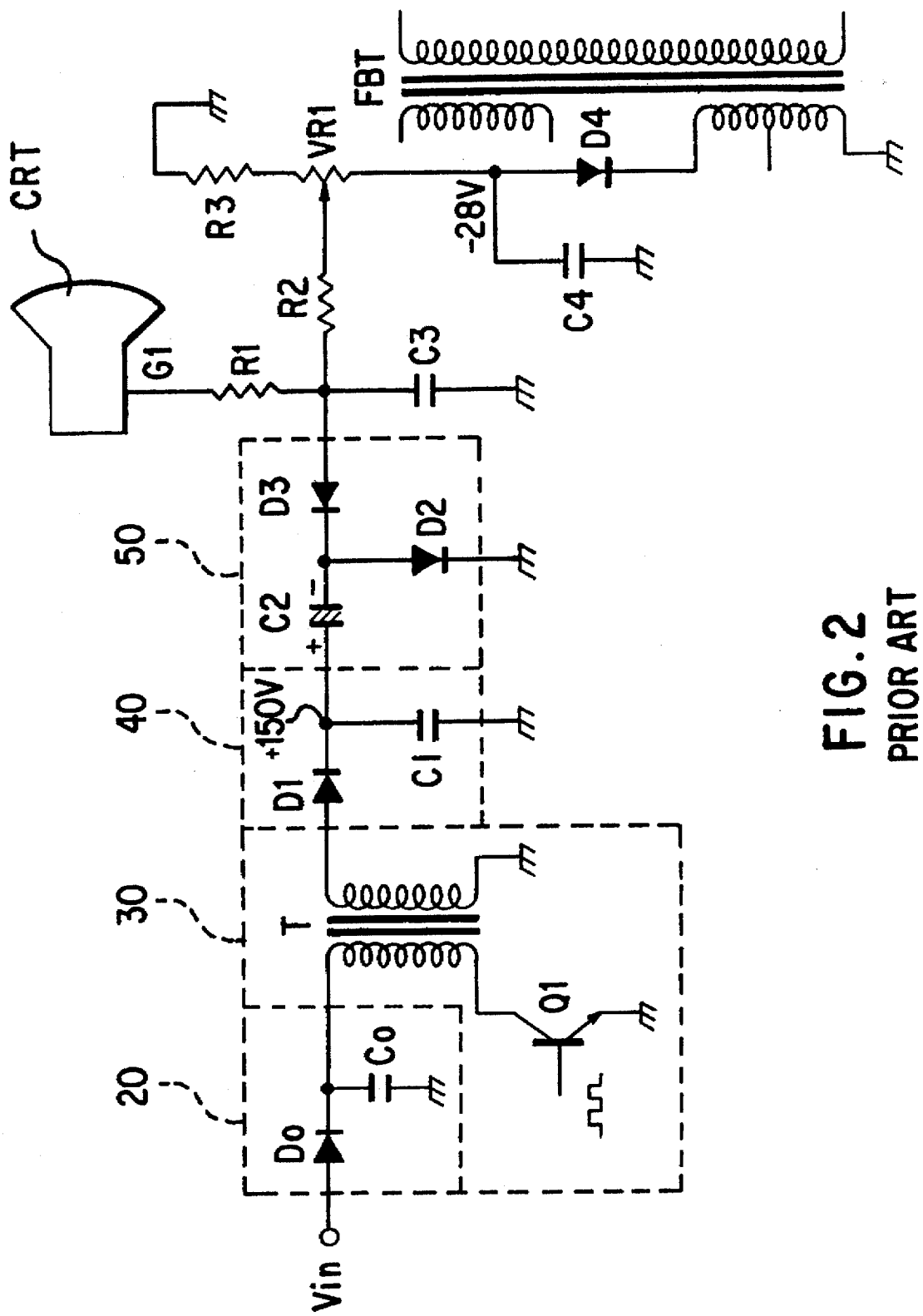
FIG. 2 is a circuit diagram illustrating the conventional circuit of FIG. 1.

Turning now to the drawings, a representation of an exemplary design for a spot elimination circuit is illustrated in block form in FIG. 3. The sequence comprises a horizontal deflection portion 100 for oscillating a frequency synchronized with a horizontal synchronizing signal and for generating a high voltage using a flyback transformer is commonly connected to a high voltage generator 200 and horizontal deflection output circuit 300 for horizontal deflection of a cathode emission using an oscillated frequency received from horizontal deflection portion 100. A rectifier 400 is connected to high voltage generator 200 for receiving and smoothing a high voltage input. A spot elimination circuit 500 is connected to rectifier 400 for charging and discharging a smoothed high voltage. An output of spot elimination circuit 500 is connected to a first grid G1 of the CRT.

Figure 4:
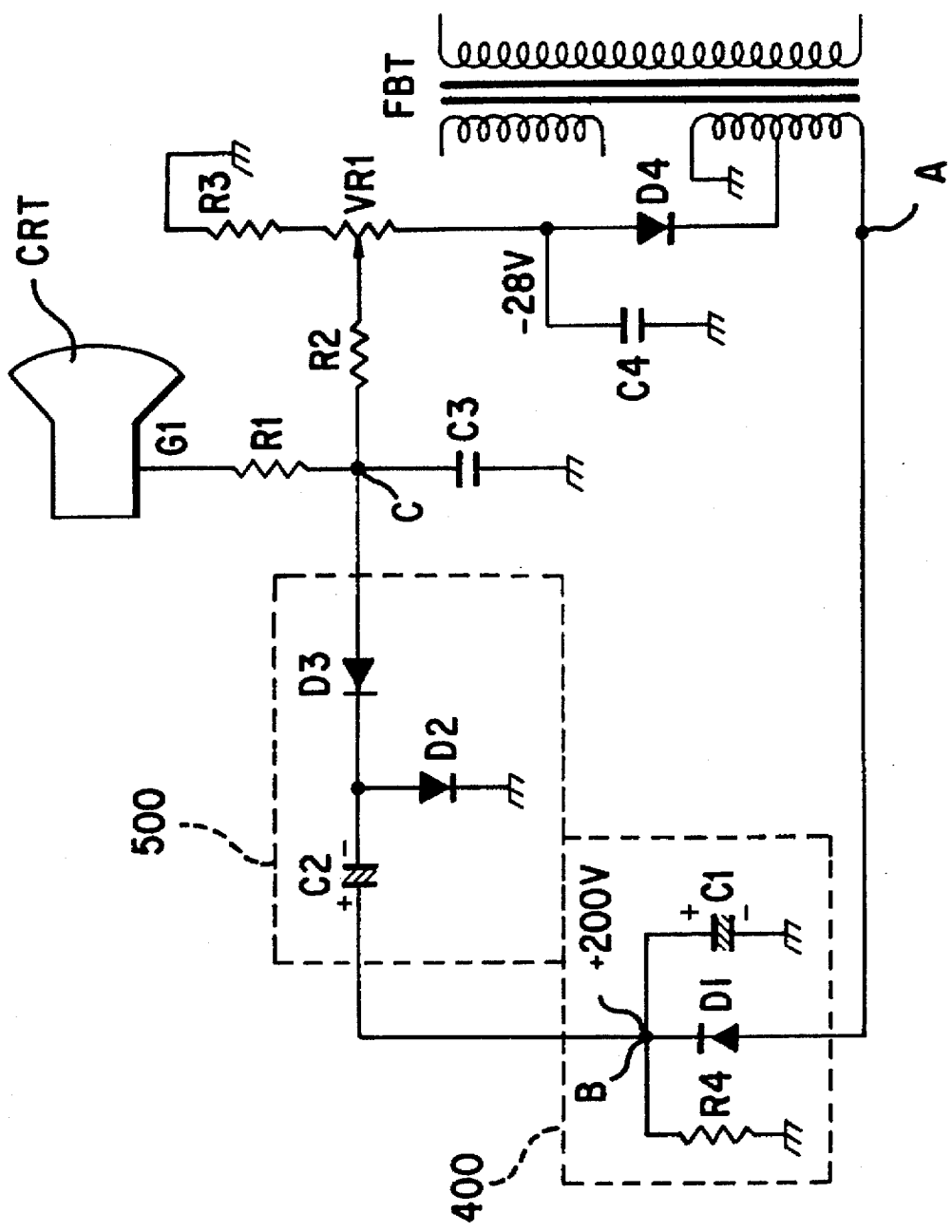
FIG. 4 is a circuit diagram illustrating the spot elimination circuit portion of the sequence of FIG. 3.

Referring now to FIG. 4 which shows rectifier 400 and spot elimination circuit 500 in detail, similar reference numerals designate corresponding elements as discussed with regard to FIG. 3. A separate turn portion is additionally provided at secondary winding of the flyback transformer in horizontal deflection portion 100, for generating a high voltage, and an output terminal A of the separate turn portion is connected to rectifier 400. A resistor R4 and a smoothing capacitor C1 are connected in parallel between first node B and a reference potential. The first node commonly connects the cathode of diode D1 whose anode is connected to the output terminal A of the separate turns portion of the flyback transformer.

Spot elimination circuit 500 has a capacitor C2 connected to first node B for charging an output voltage of rectifier 400 and for discharging the voltage charged. Capacitor C2 is coupled to the anode of diode D2 and the cathode of diode D3, diodes D2 and D3 being coupled in series between a second node C and a reference potential. Diode D2 is turned on while capacitor C2 is charged, and diode D3 is turned off at that time interval, but turned on during a discharge period.

A diode D4 for rectifying an output voltage of approximately −28 Volts of the flyback transformer is connected between an arm of variable resistor VR1 and a center tap of the second secondary winding. A smoothing capacitor C4 is connected in parallel with diode D4 between the arm of variable resistor VR1 and a reference potential. The variable resistor VR1 regulates the voltage level of approximately −28 Volts and applies a regulated voltage to a first grid G1 via resistors R1 and R2 which are serially connected so as to control the discharge of the CRT during the OFF mode of spot elimination circuit 500.

Referring now to the above configuration, the spot elimination circuit 500 will be described in detail. In the spot elimination circuit 500, the high voltage level of output terminal A of second secondary winding of the flyback transformer in horizontal deflection portion 100 in a normal state is generally at a constant level of 200 Volts. Capacitor C2 is charged to that level via a smoothing circuit comprising diode D1 and smoothing capacitor C1 of rectifier 400. In the normal operational state of horizontal deflection portion 100, diode D3 persists in an OFF state while capacitor C2 is charged thereby having no effect on the CRT. During the time period described above, the luminance of the CRT may be controlled by an input applied to first grid G1 thereon, at a voltage of approximately 28 Volts in negative polarity (i.e., −28 Volts) which is smoothed by a smoothing circuit comprised of diode D4 and capacitor C4 and varying in accordance to a regulation of variable resistor VR1.

When the power supply is shut down, horizontal deflection portion 100 then ceases generating high voltage from its flyback transformer. When any of the deflection circuits malfunctions or during carrying out of the DPMS mode, no high voltage generation is achieved in both horizontal deflection portion 100 nor high voltage generator 200. Then, a charged potential in capacitor C2 of spot elimination circuit 500 is suddenly discharged in the reverse direction, turning diode D3 on, thereby discharging voltage at a voltage level of approximately −200 Volts, being applied to first grid G1 of the CRT via resistor R1. As a result, the CRT is turned off and an emitted beam from the electron beam emitter would not reach a focused spot at the center of the phosphor screen. Phosphors on the glass faceplate of the phosphor screen are thus protected from excessive cathode discharge by the beam emitter thereby preventing burns on the screen of the CRT.

According to the spot elimination circuit as described above, the output voltage is used at an output terminal of a second secondary winding. This output is fed back as an input voltage to the circuit which positively charges the grid causing the electron emission to be repelled and preventing the emission from reaching the screen. In this manner, a cut-off voltage is supplied to the first grid of the CRT when either the deflection circuit or the high voltage generator is shut off thereby preventing the phosphor screen from burning.

While there have been illustrated and described what is to be considered the preferred embodiment of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is understood that the present invention is not limited to the particular embodiments disclosed as the best mode contemplated for carrying out the present invention, but that the present invention includes all embodiments falling within the scope of the appended claims.

I claim:

1. A spot eliminator for a cathode ray tube, said cathode ray tube having a first grid, said spot eliminator comprising:

a flyback transformer having a separate turns portion at a secondary winding thereof, said separate turns portion including a first terminal;

a smoothing circuit including a rectifier diode, said rectifier diode having an anode and a cathode, said anode coupled to said first terminal of said separate turns portion; and a spot elimination circuit coupled between said cathode of said rectifier diode and said first grid of said cathode ray tube.

2. The spot eliminator of claim 1, wherein the first terminal of the separate turns portion is a horizontal deflection output of the flyback transformer.

3. The spot eliminator of claim 1, wherein the separate turns portion further includes a second terminal coupled to a luminance control circuit.

* * * * *